United States Patent [19]
Chang et al.

[11] Patent Number: 5,398,295
[45] Date of Patent: Mar. 14, 1995

[54] DUPLEX CLIP FOR OPTICAL FIBER CONNECTOR ASSEMBLY

[76] Inventors: Peter C. Chang; I. Shun Lei; George Chou; Lujia Hwang, all of 930 W. Maude Ave., Sunnyvale, Calif. 94086

[21] Appl. No.: 118,171

[22] Filed: Sep. 8, 1993

[51] Int. Cl.6 .......................... G02B 6/38; G02B 6/26
[52] U.S. Cl. ....................................... 385/58; 385/53; 385/55; 385/59; 385/60; 385/70; 385/71; 385/77; 385/78; 385/136; 385/137; 385/139
[58] Field of Search ........................ 385/53, 55, 58, 59, 385/60, 66, 71, 72, 76, 77, 78, 84, 88, 89, 134, 136, 137, 139

[56] References Cited

U.S. PATENT DOCUMENTS

| | | | |
|---|---|---|---|
| 4,167,303 | 9/1979 | Bowen et al. | 385/89 X |
| 4,461,537 | 7/1984 | Ramer, II et al. | 385/88 X |
| 4,547,039 | 10/1985 | Caron et al. | 385/88 X |
| 4,772,081 | 9/1988 | Borgos et al. | 385/88 X |
| 4,798,440 | 1/1989 | Hoffer et al. | 385/89 X |
| 4,953,929 | 9/1990 | Basista et al. | 385/55 X |
| 4,969,924 | 11/1990 | Suverison et al. | 385/78 X |
| 5,016,968 | 5/1991 | Hammond et al. | 385/78 X |
| 5,039,194 | 8/1991 | Block et al. | 385/53 X |
| 5,076,656 | 12/1991 | Briggs et al. | 385/71 |
| 5,123,071 | 6/1992 | Mulholland et al. | 385/53 |

Primary Examiner—Brian Healy

[57] ABSTRACT

A clip (10) is composed of two halves (12). Each half (12) has a main plate (14) from which a left side wall (16) and a right side wall (18) extend vertically at two opposite side edges. Each side wall (16, 18) incorporates a corresponding auxiliary wall (26, 28), which is extending vertically from the main plate (14) approximate a central slot (20) in the main plate (14), to form a cavity (22, 24) therein. A rear wall (30) extending from the rear edge of the main plate vertically, has two generally semi-circular openings (32, 34) therein in alignment with such two cavities (22, 24), respectively. A stopper (36) is formed generally in alignment with the auxiliary wall (28) which is facing to the right wall (18). A catch (42) and a latch (38) are respectively on the right and the left walls (18, 16). Accordingly, the clip (10) can be itself formed as one piece by interconnection of two halves (12), and also can securely associate with the corresponding connectors (50) therein so that such connectors (50) can be properly aligned with the complementary connectors.

18 Claims, 2 Drawing Sheets

DUPLEX CLIP FOR OPTICAL FIBER CONNECTOR ASSEMBLY

BACKGROUND OF THE INVENTION

1. Field of the Invention

The invention relates to holding means for use with optical fiber connector assembly, especially to a duplex clip for retaining a pair of individual optical fiber connectors in a side-by-side arrangement.

2. The Prior Art

U.S. Pat. No. 4,953,929 to Basista et al, discloses an adaptor or clip for use with a pair of two individual fiber optic connectors being retained in a side-by-side arrangement and capable of relative moving for easy alignment with other complementary connectors. Because the adaptor (10) used in '929 has lateral through-openings for easy assess and reception of the corresponding connectors therein, and the retention between such adaptor and the corresponding connector housings is only implemented by pairs of projecting tabs (29) and slots (31), there may be a risk that the connector is removed from such adaptor when a significant vibration or a sudden external pulling force acted on this assembly. In this situation, the adaptor (10) may lose its original main function even though it designedly provides the attached connectors with adjustable alignment function to the complementary connectors.

U.S. Pat. No. 5,123,071 to Mulholland, discloses a overconnector assembly (10) comprising a bipartite body which is composed of two parts (76 & 77) which can be interconnected to each other with a double compartment interior to securely fasten a pair of corresponding connectors therein without any risk of inappropriate removal of the connectors therefrom. The overconnector assembly (10) is disadvantageously short of resilience itself so the connectors attached thereto can not have the beneficial function of adjustable alignment as disclosed in Basista. Secondly, such two separate parts (76 & 77) can not interconnected with each other themselves without any of such two connectors having been installed therein. This is because the bipartite body, which is composed of two separate parts (76 & 77), only provides the latch function in the direction perpendicular to the common base (83), but not in the direction along the lateral direction of such common base (83). Accordingly, such parts (76 & 77) can not formed as a unit before they associate with the corresponding connectors, and such separate parts (76 & 77) take more space and seem odd in storage and in assembling.

Accordingly, an object of the present invention is to provide a duplex clip for use with a pair of optical fiber connectors which can not only clamp the corresponding connectors therein without a risk of improper removal of such connectors therefrom, but also provide somewhat resilience for adjustable alignment of such connectors to the complementary connectors.

Another object of the present invention is to provide the duplex clip which is composed of two halves wherein such halves can be pre-assembled to each other as a unit regardless of whether any connector has been installed therein.

SUMMARY OF THE INVENTION

In accordance with one aspect thereof, the invention is generally directed to a duplex clip for use with a pair of optical fiber connectors which are retained in a side-by-side arrangement. The clip is composed of two halves. Each half has a main plate from which a left side wall and a right side wall extend vertically at two opposite side edges. Each side wall incorporates a corresponding auxiliary wall, which is extending vertically from the main plate approximate a central slot in the main plate, to form a cavity therein. A rear wall extending from the rear edge of the main plate vertically, has two generally semi-circular openings therein in alignment with such two cavities, respectively. A stopper is formed generally in alignment with the auxiliary wall which is facing to the right wall. A catch and a latch are respectively on the right and the left walls. Accordingly, the clip can be itself formed as one piece by interconnection of two halves, and also can securely associate with the corresponding connectors therein in order to have such connectors be properly aligned with the complementary connectors.

BRIEFLY DESCRIPTION OF THE DRAWINGS

DESCRIPTION OF THE PREFERRED EMBODIMENT

Reference will now be made in detail to the preferred embodiments of the invention. While the present invention has been described with reference to a specific embodiment, the description is illustrative of the invention and is not to be construed as limiting the invention. Various modifications to the present invention can be made to the preferred embodiments by those skilled in the art without departing from the true spirit and scope of the invention as defined by the appended claims.

Figure 1:
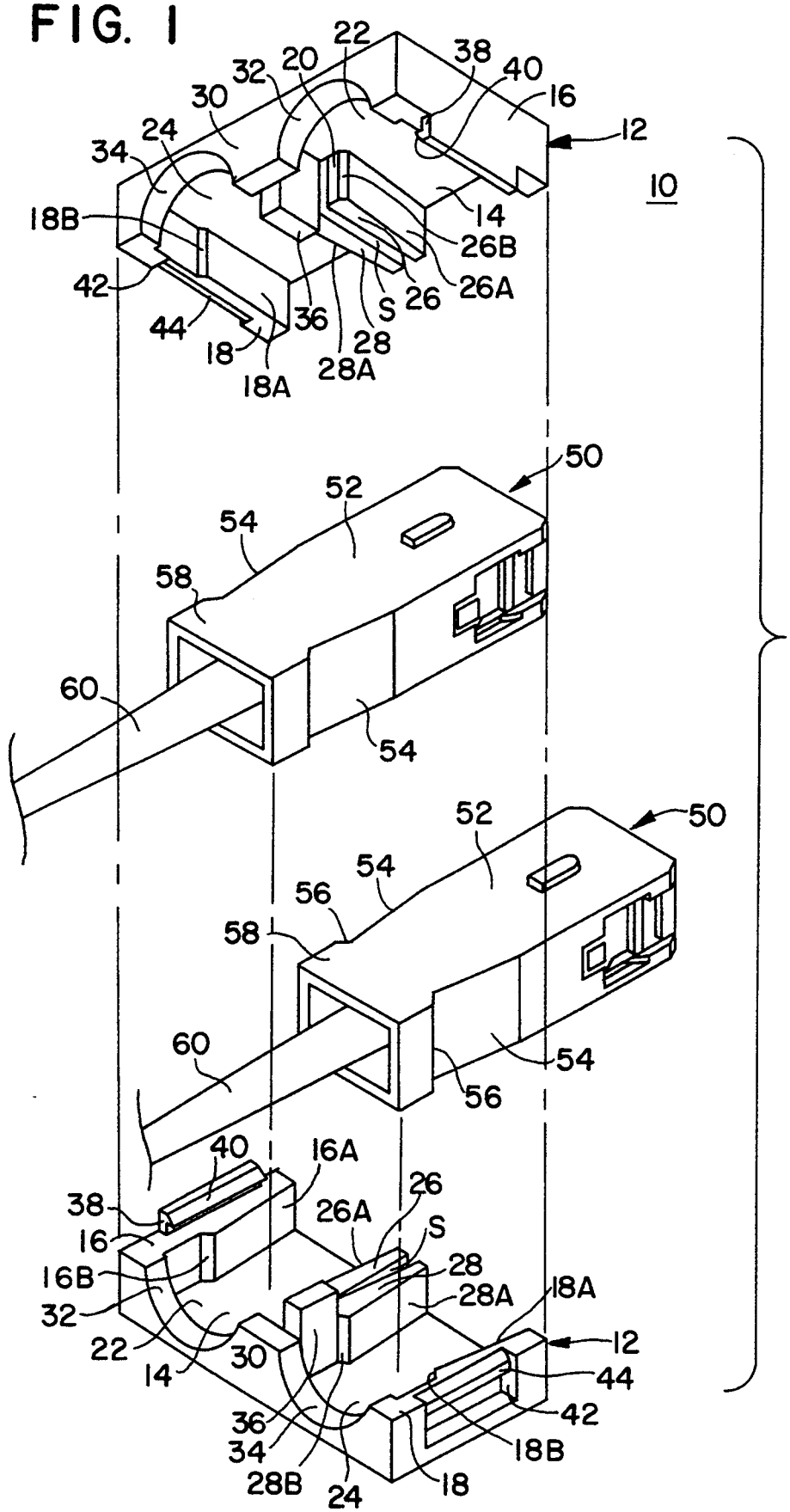
FIG. 1 is an exploded perspective view of a presently preferred embodiment of a duplex clip according to this invention, and two corresponding connectors which are to be installed therein.

It will be noted here that for a better understanding, like components are designated by like reference numerals throughout the various figures. Attention is now directed to FIG. 1 where the subject duplex clip, generally designated 10, is composed of a first (bottom) and an identical second (top) halves 12. Each half 12 has a main plate 14 from which a (first) left side wall 16 and a (second) right side wall 18 extend vertically at two opposite side edges. Along the center line of the main plate 14, a central slot 20 extends rearward from the front edge and terminates at approximate two thirds of the distance dimension in a front-to-end direction.

From the main plate 14 and beside the central slot 20, a pair of opposite (third and fourth) auxiliary walls 26, 28 extend vertically in the same direction as the side walls and opposite to the right and the left side walls 16, 18, respectively. Certainly, a space S is formed between these two auxiliary walls 26 and 28 wherein the horizontally planar dimension of such space S is generally equal to that of the slot 20. A first cavity 22 is formed between the left side wall 16 and the opposite auxiliary wall 26. Similarly, a second cavity 24 is formed between the right side wall 18 and another auxiliary wall 28 opposite thereto.

A (fifth) rear wall 30 extends from the rear edge of the main plate 14 vertically in the same direction with the right side wall 18 and the left side wall 16. A pair of generally semi-circular openings 32, 34 are positioned in the rear wall 30 in alignment with the first cavity 22 and the second cavity 24, respective.

A stopper 36 vertically extending from the main plate 14 in the same direction with the side walls 16 & 18, is disposed between the rear wall 30 and the auxiliary wall 28 in the condition that the stopper 36 is generally aligned with the auxiliary wall 28 in the front-to-end direction.

A latch 38 projects vertically from the top surface of the left wall 16 with an integral hook 40 at the end. Correspondingly, a catch 42 is positioned in the outer side portion of the right side wall 18 with an integral corresponding hook 44 for latchable reception of the latch 38 therein.

It is particularly noted that the side walls 16, 18 and the auxiliary walls 26, 28 have tapered sections 16A, 18A, 26A and 28A on the front portion and shoulder or converging sections 16B, 18B, 26B and 28B on the rear portion, respectively.

The subject duplex clip 10 is adapted to latchable secure a pair of SC type optical fiber connectors 50 therein in a side-by-side arrangement. Different from the SC type optical fiber connector disclosed in the aforementioned prior art U.S. Pat. Nos. 4,953,929 and 5,123,071, the housing 52 of the connector 50 in the present invention has a converging section 54 and a successive diverging section 56 approximate to the rear portion of each of two opposite (left and right) sides. This specific configuration of the connector 50 is to conform to the tapered sections 16(A), 18(A), 26(A), 28(A), and the shoulder sections 16(B), 18(B), 26(B), 28(B) of the subject duplex clip 10 in the present invention.

Accordingly, when assembled, these two connectors 50 can be respectively loaded into the first cavity 22 and the second cavity 24 of the bottom half 12 from the top wherein the converging sections 54 of the housings 52 respectively confront the tapered sections 16(A), 18(A), 26(A) and 28(A) of the corresponding side walls 16, 18 and the auxiliary walls 26, 28 of the bottom half 12, and the diverging sections 56 of the housings 52 respectively confront the shoulder section 16(B), 18(B), 26(B) and 28(B) of the corresponding side walls 16, 18 and the auxiliary walls 26 and 28 of the bottom half 12. Thus, the connectors 50 in the corresponding cavities 22 and 24 can not move with regard to the bottom half 12 in a left-to-right or lateral direction.

In this situation, the rear section 58 of the connector 50 loaded in the first cavity 22 is naturally sandwiched between the rear wall 30 and the shoulder sections 16(B) of the left side wall 16 and the shoulder section 26(B) of the auxiliary wall (26). Similarly, the rear section 58 of the connector 50 loaded in the second cavity 24 is naturally sandwiched between the rear wall 30 and the shoulder section 18(B) of the right side wall 18 and the shoulder section 28(B) of the auxiliary wall (28). Thus, the connectors 50 in the cavities 22 and 24 can not move with regard to the bottom half in the front-to-end or lengthwise direction.

Successively, the top half 12 is vertically aligned and fastened to the bottom half 12 by means that the latch 38 of the top half 12 is latchable captured in the catch 42 of the bottom half 12 and the latch 38 of the bottom half 12 is latchable captured in the catch 42 of the top half 12. The top half 12 incorporates the corresponding connectors 50 in the same way as the bottom half 12 does, and such details are not illustrated herewith. Accordingly, the top surface and the bottom surface of the connector 50 respectively confront the main plate 14 of the top half 12 and the main plate 14 of the bottom half 12, thus preventing such connector 50 from vertical movement within the clip 10. Because the connectors 50 is retrained in three dimensional (i.e. lengthwise, lateral and vertical) directions as aforementioned, such connectors 50 can be securely retained in the clip 10 without any risk of removal therefrom.

Figure 2:
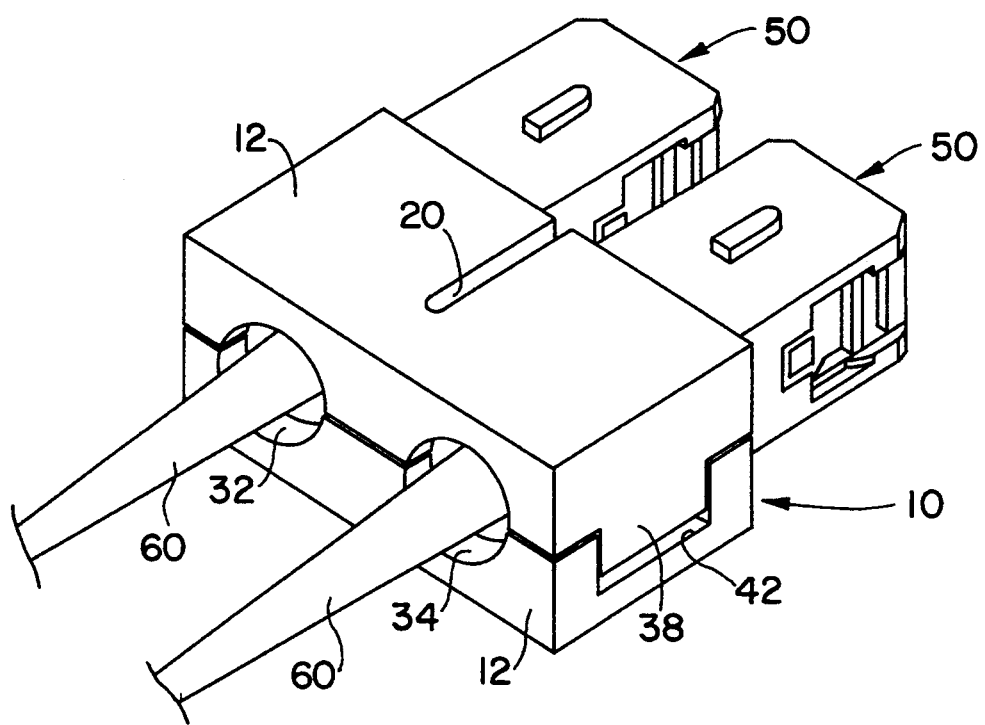
FIG. 2 is a perspective view of the assembled duplex clip with the corresponding connectors therein of FIG. 1.

As shown in FIG. 2, it is appreciated that when the clip 10 is assembled with the inner connectors 50, the front portion of each connector housing 52 projects out of the corresponding front opening which is formed by the main plate 14, one side wall 16 (or 18) and one auxiliary wall 26 (or 28) of the bottom half 12, and the main plate 14, one side wall 18 (or 16) and one auxiliary wall 28 (or 26) of the top half 12. Similarly, the boot 60 of the connector 50, which may encircle the fiber, projects out of the rear circular opening formed by a pair of corresponding semi-circular openings 32 and 34 of the respective bottom half 12 and top half 12.

It can be understood that when the top half 12 and the bottom half 12 are assembled together, the stopper 36 of the top half 12 is positioned in the space between the auxiliary wall 26 and the rear wall 30 of the bottom half 12, and the stopper 36 of the bottom half 12 is positioned in the space between the auxiliary wall 26 of the rear wall 30 of the top half 12. Accordingly, the stopper 36 of the top half 12 and the stopper 36 of the bottom half 12 abut against each other in the lateral direction. This is a main feature of the present invention in comparison with the related prior art U.S. Pat. No. 5,123,071. Lack of cooperation of these two opposite stoppers 36 disposed on the top and the bottom halves 12, respectively, the top half 12 and the bottom half 12 of the clip 10 can not themselves latchable interconnected to each other unless at least one connector 50 is installed in the cavity 22 or 24 therein. It can be seen that if there is no stoppers 36 on the top and the bottom halves 12, respectively, the clip 10 can not itself be a unit only through the latches 38 and the catches 42 of the two halves 12. It is because there is no proper restraint for the relative movement of each half 12 in a lateral direction. In other words, the top half 12 can move to the right and the bottom half 12 can move to the left because such two latches 38 on the respective halves 12 incorporating the corresponding catches 42 are interlocked in the same one lateral direction. This configuration results from the top half 12 and the bottom half 12 being manufactured in the exactly same form which allows using a single mold for saving cost. Therefore, if no stopper 36 exist, the top half 12 and the bottom half 12 can be interconnected to each other only under the condition of connectors being installed therein because the internal snugly installed connector(s) can prohibit the two halves 12 from relatively moving away from each other in a laterally direction opposite to the aforementioned lateral direction in which the latches 38 and the catches 42 function. In the present invention, by using the stopper means 36, the top half 12 and the bottom half 12 can be fastened to each other regardless of whether there is the connector having been installed therein. This feature in the present invention allows the top half 12 and the bottom half 12 to be interconnected together as a unit before loading the connectors therein, and thus makes it neat and space-saving for storage and transportation of such clip to the user.

In the present invention, even though the top half 12 and the bottom half 12 of the clip 10 have been pre-assembled as a unit encircling the fiber cable (not shown) beforehand, the corresponding connectors can be installed thereto without disassembling such one-unit clip 10. The connector housing 52 is allowed to move into the corresponding cavity 22 or 24 from the front opening of the clip 10, along the tapered sections 16(A), 18(A), 26(A) and 28(A) of the side walls 16, 18 and the auxiliary walls 26, 28, with the rear section 58 of the housing 52 engaging and pushing outwardly the corresponding confronting tapered sections of the side walls and the auxiliary walls in the lateral direction. The space S between two auxiliary walls 26 and 28 allows such auxiliary walls 26 and 28 to be moved close to each other, so by means of the tapered sections of the clip 10, rear section 58 of the connector housing 52 in a rearward movement can push away or deflect the confronting side walls and auxiliary walls outwardly without too much endeavor until it abuts against the rear walls 30 of the clip 10. At the same time, the rear section 58 is embedded between the rear walls 30 and the shoulder sections 16(B), 18(B), 26(B) and 28(B) of the side walls and the auxiliary walls. Under this situation, the outwardly deflected side walls 16, 18 and auxiliary walls 26, 28 of the clip 10 is resumed in original position due to their own resilience, and the shoulder section 16(B), 18(B), 26(B) and 28(B) incorporate the rear walls 30 to sandwich the rear section 58 of the connector 50 therebetween for retention of the connector 50 in the clip 10 without withdrawal from the front opening of the clip 10.

It can be contemplated that the space S and the slot 20 facilitate somewhat a relative freedom of movement of the auxiliary walls 26, 28 in a lateral direction, so the connectors associated with the subject clip 10 can adjustably aligned to another pair of complementary connectors received in an adaptor as designated by numeral 17 in Basista et al. or by numeral 9 in Mulholland et al. This minor movement accommodates for manufacturing tolerances while still assuring successfully insertion of the connectors 50 within the adaptor.

It is also seen that because the bottom half 12 and the top half 12 of the clip 10 can themselves be assembled as a unit due to the stopper 36 without consideration of any connector therein, the required tolerance limits between the clip and the connector housing may not be strict. This will make the manufacturing process easy and economic. Differently, the means used in Mulholland needs the precisely conforming profiles between the interior of the duplex clip and the exterior of the connector housing for prevention of disassembly of two assembled parts (halves) due to any inappropriate gap, between the connector housing and the clip, which may induce the two parts to relatively move in a lateral direction and jeopardize the latching function between those two parts. Moreover, in the present invention the clearance allowed between the exterior of the connector housing and the interior of the clip also facilitates the freedom of movement of the connector housing which is also helpful in alignment of the connectors in the clip with the complementary connectors in the aforementioned adaptor.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

Therefore, persons of ordinary skill in this field are to understand that all such equivalent structures are to be included within the scope of the following claims.

What is claimed is:

1. A duplex clip for use with a pair of optical fiber connectors, comprising:
    a bottom half and an identical top half; each half including:
        a main plate from which a left side wall and a right side wall extending vertically at two opposite side edges thereof;
        a central slot positioned in the main plate;
        a pair of spaced auxiliary walls extend vertically from the main plate approximate said central slot to incorporate the left side wall and the right side wall to form a first cavity and a second cavity, respectively;
        a rear wall extending vertical from a rear end of the main plate; and
        a latch positioned on one side wall and a catch positioned in the other side wall.

2. The duplex clip described in claim 1, wherein each half has a space between two opposite auxiliary walls.

3. The duplex clip described in claim 1, wherein each half has a stopper positioned between the rear wall and the auxiliary walls, said stopper being in alignment with one of the auxiliary walls in a front-to-end direction so that when the bottom half and the top half are fastened together, said two stoppers respectively positioned on two halves is in abutted engagement with each other in a lateral direction.

4. The duplex clip described in claim 1, wherein in each half, each side wall and the corresponding auxiliary wall respectively have tapered sections facing to each other.

5. The duplex clip described in claim 4, wherein in each half, each side wall and the corresponding auxiliary wall further respectively have shoulder sections adjacent to the corresponding tapered sections.

6. The duplex clip described in claim 5, wherein a rear section of said connector is sandwiched between the rear walls and the shoulder sections.

7. The duplex clip described in claim 1, wherein the rear wall of each half has a pair of openings in alignment with the corresponding cavities, respectively.

8. The duplex clip as described in claim 1, wherein said latch projecting from a top surface of the left side wall and said catch positioned in the right side wall.

9. A duplex clip for use with a pair of connectors, comprising:
    a first half and an identical second half adapted to be interconnected with each other; each half including:
        a main plate from which a first wall and a second wall extend vertically at two opposite side edges thereof; and
        a third wall and a fourth wall extending from the main plate and spaced from each other with a space therebetween wherein the third wall is facing to the first wall to form a first cavity therebetween and the fourth wall is facing to the second wall to form a second cavity therebetween;
        each wall having a tapered section and a shoulder section facing to the corresponding cavity.

10. The duplex clip as described in claim 9, wherein each half further comprises a fifth wall vertically extending from a rear edge of the main plate.

11. The duplex clip as described in claim 9, wherein the main plate of each half has a central slot in alignment with the space between the third wall and the fourth wall.

12. The duplex clip as described in claim 9, wherein each half has a stopper positionably aligned between the fifth wall and the fourth wall.

13. The duplex clip as described in claim 9, wherein each half has a latch positioned on the third wall and a catch positioned in the fourth wall.

14. A duplex clip for use with more than one juxtaposed fiber optic connectors, comprising:
   a first half and an identical second half adapted to be self- interconnected with each other; each half including:
   a main plate from which a plurality of walls extend vertically to form more than one side by side arranged cavities therebetween; and
   a stopper vertically extending from the main plate in a direction same as the walls whereby with cooperation of latch means and catch means of the duplex clip, the stopper of the first half which is in abutted engagement with the stopper of the second half in a lateral direction, can allow the first half and the second half to be pre-assembled as a unit without any connectors therein.

15. The duplex clip as described in claim 14, wherein said walls of each half includes a pair of side walls extending vertically from the main plate at two opposite side edges and a pair of spaced auxiliary walls respectively facing to the corresponding side walls.

16. The duplex clip as described in claim 14, wherein each half further includes a rear wall extending vertically from a rear edge of the main plate and having more than one opening in alignment with the corresponding cavities.

17. The duplex clip as described in claim 14, wherein each wall of each half has a tapered section and a shoulder section facing to the corresponding cavity.

18. The duplex clip as described in claim 14, wherein each half has one latch means and one catch means.

* * * * *